April 19, 1938.   O. C. TRAVER   2,114,865
PEAK ALTERNATING CURRENT MEASURING APPARATUS
Filed Feb. 6, 1937   2 Sheets-Sheet 1
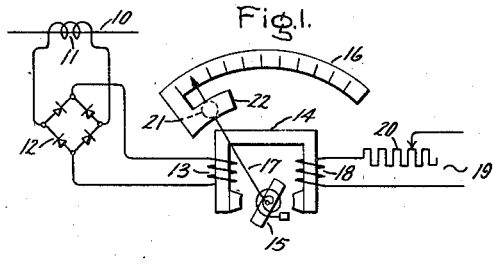
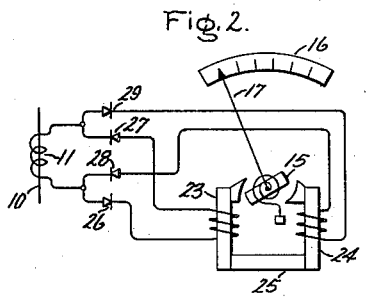
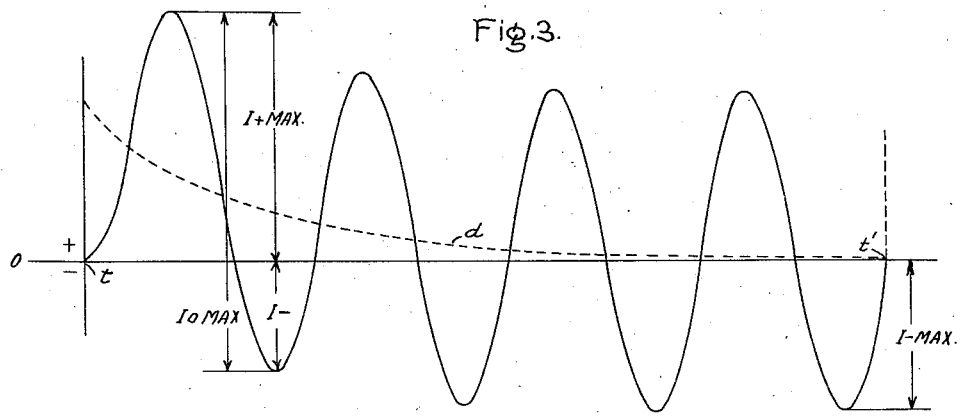
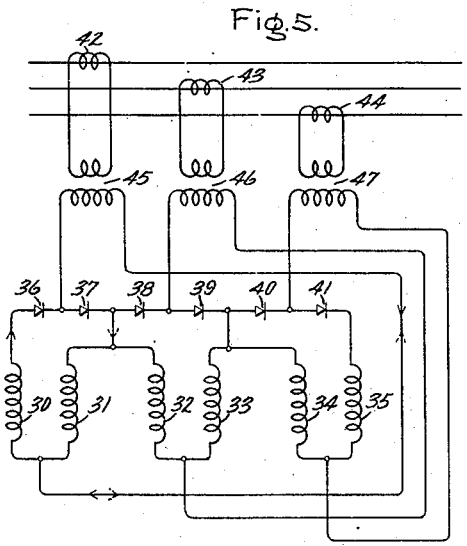
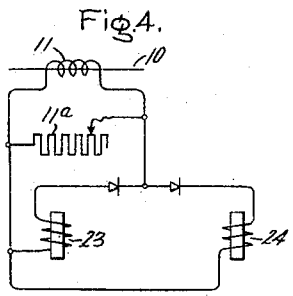
Inventor:
Oliver C. Traver,
by Harry E. Dunham
His Attorney.

April 19, 1938.     O. C. TRAVER     2,114,865

PEAK ALTERNATING CURRENT MEASURING APPARATUS

Filed Feb. 6, 1937     2 Sheets-Sheet 2

Inventor:
Oliver C. Traver,
by Harry E. Dunham
His Attorney.

Patented Apr. 19, 1938

2,114,865

UNITED STATES PATENT OFFICE 2,114,865

PEAK ALTERNATING CURRENT MEASURING APPARATUS

Oliver C. Traver, Drexel Hill, Pa., assignor to General Electric Company, a corporation of New York Application February 6, 1937, Serial No. 124,398

9 Claims. (Cl. 175—183)

My invention relates to current-measuring apparatus for use on alternating-current circuits and particularly apparatus for measuring various surge current values, components, and relations which occur only momentarily during transients caused by short circuits, lightning strokes, switching, etc. Such measurements are of value to electrical engineers in connection with problems that concern the safety, protection, and design of various electrical apparatus, switching procedure, maintenance of service, protection of operators in determination of the location of faults, etc.

An important object of my invention is to provide simple and reliable surge current-measuring apparatus which distinguishes between positive and negative transient current values and components without the necessity of using high cost rectifier apparatus.

Another important object of my invention is to provide standard apparatus of the character specified which may be used in a large variety of ways for measuring numerous quantities without burdensome installation and maintenance expenses.

Other objects of the invention will appear as the description proceeds.

In carrying my invention into effect, I make use of the inexpensive copper oxide, or other type of rectifier for segregating positive and negative surge current components and I use pick-up devices composed of units of permanent magnet material which are temporarily permanently magnetized in response to the segregated surge current components under investigation. The strength of such permanent magnets can be measured at leisure and the surge current values thus ascertained. Before any magnetic pick-up device is used again, it is demagnetized. The degree at which the magnetic pick-up devices are magnetized by the surge currents is within the range below complete saturation, so that the permanent magnet strength remaining in the pick-up device is proportional to the surge current under investigation. Owing to the simplicity and low cost of these devices and the flexibility with which they may be used, a variety of novel and useful measurements become possible by their use.

Figure 6:
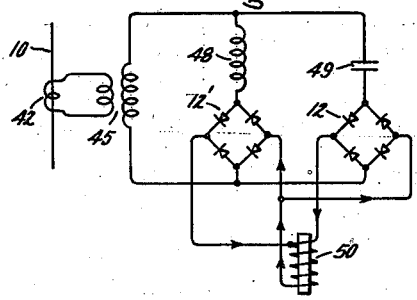
Figure 7:
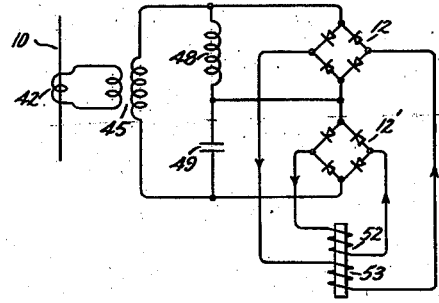
Figure 8:
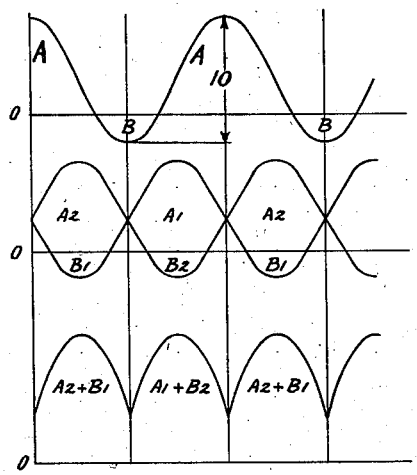
Figure 9:
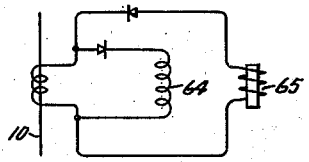
Figure 10:
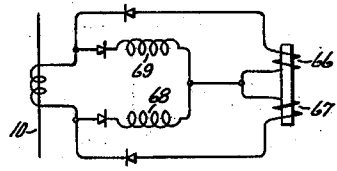
Figure 11:
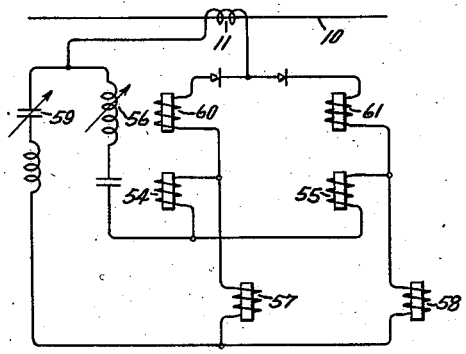
Figure 12:
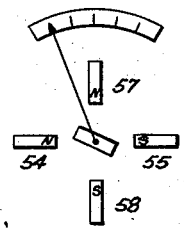

The features of my invention which are believed to be novel and patentable will be pointed out in the claims appended hereto. For a better understanding of my invention, reference is made in the following description to the accompanying drawings in which Fig. 1 illustrates measuring apparatus for measuring the peak value of a current surge regardless of its polarity; Fig. 2 illustrates apparatus for measuring the positive and negative peak values of the current surges or their sum or difference; Fig. 3 represents an oscillograph record of a typical transient current caused by a short-circuit condition on an alternating-current line; Fig. 4 shows a simplified transient current pick-up circuit embodying the present invention; Fig. 5 illustrates connections and apparatus assembly for three-phase surge measurements; Figs. 6 and 7 illustrate different arrangements embodying phase-shifting devices for obtaining measurements of the maximum oscillating component of surges; Fig. 8 represents surge current curves explanatory of the operation of Figs. 6 and 7; Figs. 9 and 10 show circuits for obtaining an approximate measurement of the sum of positive and negative components of an oscillation; Fig. 11 represents a modification of my invention which includes tuned circuits whereby measurements indicative of the frequency of an oscillatory surge may be obtained; and Fig. 12 represents the elements of a magnetic ratio instrument for determining the average frequency of an oscillatory surge using pick-up magnets energized in the system of Fig. 11.

In Fig. 1, I have shown apparatus for measuring the peak value of an alternating-current surge that subsides too quickly to be measured by the conventional form of measuring apparatus. In Fig. 1, 10 represents an alternating-current line in which a current surge may occur due to a short circuit, a lightning stroke, or some other transient condition. 11 is a current transformer which has its secondary connected through a full-wave rectifier bridge 12 to the coil 13 of a special current-measuring device which gives a semi-permanent indication of the maximum current that has flowed in line 10. The rectifiers used are of the inexpensive, dry, copper oxide contact type. The core 14, or a portion thereof, of this instrument is made from permanent magnet steel so that it is permanently magnetized by the direct current which flows in coil 13 from the rectifier 12. This pick-up core may be of the nature of the magnetic pick-up elements described in United States Patent No. 1,942,052, Faust et al., January 2, 1934. The coil 13 must have a sufficient number of turns as compared to the cross-section of the pick-up core element to cause proper magnetization thereof by a surge current when reduced by the current transformer to a value that can be properly handled by the type of rectifiers used. The strength of the permanent magnet thus produced will be proportional to the maximum current through coil 13 and, hence, to the maximum peak value of any alternating-current surge that occurs in line 10.

Between the pole pieces of such permanent magnet is an iron vane type of armature 15, which is biased out of alignment between the pole pieces by a spiral spring. The armature tends to turn to align its magnetic vane with any flux crossing between the pole tips and, hence, it will produce a deflection which is a measure of the strength of the permanent magnet. Such measurement deflection will persist after the maximum surge current has passed until the core 14 has been demagnetized.

The instrument is provided with a scale 16 and pointer 17 calibrated to indicate maximum surge current values in line 10. After a surge of a predetermined magnitude has occurred and its value is ascertained from reading the instrument, it will be desirable to demagnetize the core 14 to place the device in condition for measuring the next surge that may occur. For this purpose, we may provide a second coil 18 which is to be excited by a gradually decreasing value of alternating current from a source 19, a rheostat 20 being provided to control the demagnetizing current. This coil will normally be open-circuited and used only when the instrument is to be demagnetized and its indication brought back to zero. It will be understood that it is not intended that this apparatus will be used to measure the ordinary full load current of line 10 and, while such current will produce some magnetization of core 14 and possibly a slight deflection of the instrument, this will not interfere with its use for measuring occasional, much higher current surges because the strength of a permanent magnet depends upon the maximum value of the exciting direct-current ampere turns and the device will be designed to produce a substantial deflection only after an overload current condition has occurred.

If desired, the instrument pointer may be provided with a target, shown in dotted lines at 21, which, for low permanent magnet values, is hidden from view by a screen 22. Such a target will move into view from behind the screen when a surge of sufficient value to be interesting occurs and will indicate that the surge value should be recorded and the instrument demagnetized.

It will be evident that the device of Fig. 1 will measure the maximum current surge value whether it be positive or negative and will not distinguish between positive and negative values. Thus, it will measure the value (I+max.) of the oscillatory surge represented in Fig. 3. It may be stated that the curve of Fig. 3 represents an oscillograph record of a typical short-circuit current having positive transient displacements such as often occur on alternating-current circuits where the short circuit began at time $t$. The dotted line $d$ represents the nature of the displacement of the oscillatory surge from the zero current line 0. After about four oscillations, the transient displacement or direct current component of the wave has practically all decayed away at time $t'$ and the time $t$ to $t'$ may be considered the time during which a circuit breaker is opening to clear the short at time $t'$ by which time the surge current has reached a steady state and the maximum negative value (I—max.). Experience has taught engineers how to make use of the values (I+max.) and (I—max.) in determining the approximate line location of the short circuit, in designing proper line protective devices and in proposing changes in given systems to minimize the effect of such disturbances.

Fig. 2 represents a device in which the positive and negative current surge values are segregated and arranged to energize separate coils of the pick-up winding and to magnetize separate permanent magnet core parts 23 and 24 shown connected in series in the magnetic circuit of the measuring instrument. In this representation, the pole pieces and the keeper 25 may be of soft iron. If the cores 23 and 24 are magnetized while in place, the keeper 25 should be removed until a reading is taken. In this example, it will be evident that the surge of one sign which we may designate "plus" will pass through rectifiers 26 and 27 to magnetize core part 23, and the surge of the "negative" sign will pass through rectifiers 28 and 29 and magnetize core part 24. Thus, there is full wave rectification. Where the core parts 23 and 24 are connected to pass their fluxes in the same direction in the magnetic circuit, the instrument will measure the sum of the plus and minus surges or the maximum value of the oscillatory surge that is (I+max.)+(I—max.), Fig. 3. After such measurement, core part 23 may be reversed to obtain a measurement corresponding to (I+max.)—(I—max.). Thus the summation measurement may be algebraic. Then core parts 23 and 24 may be replaced by soft iron parts, like part 25, and the permanent magnet 23 placed where soft iron core part 25 is in Fig. 2 to obtain a measurement of (I+max.) alone. Then, substitute permanent magnet 24 in place of permanent magnet 23 in this last example and obtain a measurement of (I—max.). Also, we might provide a soft iron shunt part for one of the core parts 23 or 24 to obtain the measurements (I+max.) or (I—max.). The calibration of the instrument should be checked under these different measurement conditions and the calibration suitably modified to give consistent results if found necessary. It will be understood that the permanent magnet core parts 23 and 24 may be magnetized in coils which are no part of the instrument shown and, after being so magnetized, assembled in the magnetic circuit of the instrument, as explained above, to obtain any one or more of the measurements described. This is represented in the simplified rectifier magnetizing circuit of Fig. 4 where full wave rectification is obtained but only two rectifiers are required. In any case, where the secondary current of transformer 11 is likely to be in excess of that which may be handled by a standard rectifier, a suitable shunt 11a may be connected across the secondary circuit as indicated in Fig. 4, or an auxiliary current transformer may be used as at 48, Fig. 5.

In Fig. 5, I have shown apparatus for magnetizing six permanent magnet pick-up devices in response to positive and negative surge currents in the three lines of a three-phase power system. The six pick-up core pieces of permanent magnet material, such as core piece 23 of Fig. 2, being initially demagnetized will be inserted in the six pick-up coils 30 to 35. The rectifier units 36 to 41 may be assembled in a stack as is customary in assembling a number of small, dry disk type copper oxide rectifiers. Where the line current transformers 42, 43, and 44 are standard five-ampere secondary current transformers, additional transformers 45, 46, and 47 may be inserted between the line transformers and the rectifier pick-up coil circuit to reduce the rectifier currents expected to economically match the current rating of the standard sized copper oxide dry disk rectifier. It will be evident from the connections shown that pick-up coil 30 will be traversed by currents proportional to surge currents of one sign in the primary of line transformer 42 and that pick-up coil 31 will respond to surge currents of the opposite sign in the primary of line transformer 42 utilizing rectifier units 36 and 37. The full line arrow heads represent the current circuit for pick-up coil 30 and the dotted line arrow heads represent the current circuit for pick-up coil 31. The nature of current flow and circuits for the remaining pick-up coils will be evident from the connections without further explanation. It is seen that the number of connections and rectifier units are reduced to a minimum and that a compact, relatively low cost, three-phase surge current measurement outfit is provided.

Figs. 6 and 7 show embodiments of the invention for obtaining a measurement of the maximum oscillation surge component ($I_0$max.), Fig. 3, in a single pick-up device. In Fig. 6, line 10 is provided with a current transformer 42. The secondary of the current transformer is connected to a step-down current transformer 45 and its secondary is connected to parallel phase-shifting full-wave rectifier circuits. One of these circuits includes the inductance 48 in series with full-wave rectifier bridge 12'. The other parallel circuit includes the condenser 49 in series with full-wave rectifier bridge 12. The direct-current output circuits of both rectifier bridges are connected in parallel to the pick-up coil 50 such that the direct current from both bridges flows in the same direction in coil 50.

Assume now that line 10 is traversed by an oscillatory surge having a positive displacement such as is represented in the top curve of Fig. 8, A representing the positive component and B the negative component of such surge. In Fig. 6, this surge is impressed on both of the parallel connected phase-shifting rectifier circuits. Positive surge component A is advanced in phase in traversing condenser circuit 49 and may be represented as $A_1$ in the middle set of curves, Fig. 8. Likewise, the negative component B is advanced in phase and is correspondingly displaced and represented at $B_1$ in the middle set of curves, Fig. 8. The surge in traversing the circuit including inductance 48 is retarded in phase and its positive and negative components may be represented at $A_2$ and $B_2$ in the central group of curves, Fig. 8. If the phase shift in each case is 90 degrees, and it may be made sufficiently near that amount for good measurement results, the positive portions of the advanced wave and the negative portions of the retarded wave will occur simultaneously. Likewise, the negative portions of the advanced wave will occur simultaneously with the positive portions of the retarded wave. Thus, $A_1$ and $B_2$ occur simultaneously and $A_2$ and $B_1$ occur simultaneously. The negative components in passing through the rectifier bridges are rectified and flow to pick-up coil 50 simultaneously with those positive components which occur simultaneously. Thus, the retarded negative wave $B_2$ is rectified in bridge unit 12' simultaneously with the passage of the advanced positive wave $A_1$ through bridge 12 and corresponding currents flow to and are added in pick-up coil 50 simultaneously. Likewise, 180 degrees time phase sooner or later, advanced negative wave $B_1$ is rectified in bridge 12 and flows to pick-up coil 50 at the same time the retarded positive wave passes through rectifier bridge 12' to the pick-up coil and these components are added. This rectified summation is represented in the lower curves of Fig. 8 and it will be evident that $A_1$ max. plus $B_2$ max. and $A_2$ max. plus $B_1$ max. are equal to and represent the distance $I_0$ from the tip of positive wave A to the tip of negative wave B.

In Fig. 8, the two full waves of the surge have been represented as of equal magnitude for the sake of simplifying the explanation of Fig. 6. If the surge is of usual character, the value $I_0$ will vary, as is evident from Fig. 3 and, when a pick-up magnet is inserted in coil 50 of Fig. 6 and a surge such as is represented in Fig. 3 occurs, the pick-up magnet will be magnetized in accordance with substantially the maximum surge oscillation or ($I_0$max.), Fig. 3. The value ($I_0$max.) is in this case less than $(I+\text{max.}) + (I-\text{max.})$, and thus it is seen that the arrangement of Fig. 6 is for measuring the former quantity although there may be surges where these quantities happen to be equal.

Fig. 7 shows a connection by means of which results similar to those obtained with Fig. 6 may be had. Inductance 48 and condenser 49 are connected in series and in parallel with rectifier bridges 12 and 12', respectively. Current through bridge 12 will be leading and current through bridge 12' will be lagging to accomplish the phase shifts desired. Another difference, which, however, could be applied to Fig. 6, is that the currents from the two rectifier bridges are fed to separate pick-up coils 52 and 53 comprising the pick-up winding. When these coils are connected to produce flux in the same direction in the pick-up magnet, the results will be the same as with Fig. 6. However, one coil may be reversed to obtain a measurement in the pick-up magnet of $(I+\text{max.}) - (I-\text{max.})$, Fig. 3, or A—B, Fig. 8, the maximum displacement component of the surge. This may also be termed the maximum direct-current component of the surge.

In Figs. 9 and 10, I have shown arrangements for accomplishing an approximate summation measurement of the positive and negative components of an oscillation by using inductance in the rectifier pick-up circuit to prolong the effect of a current impulse of one sign so that the following impulse of opposite sign will be superimposed thereon to a large degree. Thus, in Fig. 9, assume a positive current flow through a large inductance 64 followed by a negative current flow through pick-up coil 65 of small inductance. The positive current impulse will die out slowly because of the inductance 64 and thus tend to feed current through the pick-up coil 65 during the negative current impulse therethrough. This will produce a summation magnetization effect on the pick-up magnet proportional to the sum of the positive and negative impulses.

In Fig. 10, the pick-up magnet has two coils 66 and 67, and inductances 68 and 69 are employed in series with the pick-up coils and rectifiers as shown. Assume a positive impulse through inductance 68 and coil 66 followed by a negative impulse through inductance 69 and coil 67, both tending to magnetize the pick-up magnet in the same direction. Due to the inductances, the impulses will die out slowly and will thus exist in the pick-up coils in overlapping relation, producing a summation measurement effect.

In Fig. 11, I have shown an embodiment of my invention for distinguishing between high and low-frequency oscillatory surges. It will be noted that pick-up coils 54 and 55 are connected in the rectifier circuit to pick up positive and negative surge components which flow through the series connected predominating tuning inductance 56. Also pick-up coils 57 and 58 are connected in parallel with pick-up coils 54 and 55 in the rectifier circuits but in series with a predominating tuning condenser 59. The two tuned circuits thus formed are connected in parallel to be energized from the secondary of current transformer 11. There may also be included plus or minus surge pick-up coils 60 and 61 through which all of the surge current of corresponding sign must flow. An oscillatory current will divide between the two tuned circuits in a manner which depends upon the frequency of the surge and the manner in which the circuits are tuned. Let us assume, for example, that the condenser circuit 59 is tuned to a high frequency HF, and that inductance circuit 56 is tuned to pass lower frequency surges LF. Let us further assume that the tuning is not so sharp but that both circuits will pass some current at intermediate frequencies. It will now be apparent that the various pick-up device measurements will show the following:

Device 60 maximum positive surge current.
Device 54 maximum positive LF surge current component.
Device 57 maximum positive HF surge current component.
Device 61 maximum negative surge current component.
Device 55 maximum negative LF surge current component.
Device 58 maximum negative HF surge current component.

From a comparison of high and low-frequency component measurements, we can determine approximately the average frequency of the surge oscillation. If desired, the pick-up magnets 54, 55, 57, and 58 may be transferred to a magnetic vane ratio instrument as represented in Fig. 12, which then measures the ratio between the resultant strength of the LF magnets 54 and 55 and the resultant strength of the HF magnets 57 and 58 and gives an indication calibrated in terms of frequency. Also, in Fig. 12, the negative surge measurement magnets 55 and 58 may be removed to obtain a ratio measurement of only the positive high and low-frequency pick-up magnets in terms of frequency. Similarly, pick-up magnets 54 and 57 may be removed to obtain a comparison measurement of magnets 55 and 58. Such an instrument may be provided with a scale calibrated in per cent positive surge component for comparing positive and negative pick-up units which have been magnetized accordingly, for example, pick-up units 60 and 61, Fig. 11.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus for use in measuring the character of current surges comprising, a current transformer, a pick-up coil connected to be energized from the secondary of said transformer, current rectifier means included in the circuit between said transformer secondary and pick-up coil for the purpose of permitting current to flow in only one direction in said coil, and a magnetizable core element of permanent magnet material within said pick-up coil.

2. Apparatus for use in measuring the character of current surges comprising, a current transformer, a pick-up winding connected to be energized from the secondary of said transformer, full-wave rectifier means included in circuit between said transformer secondary and pick-up winding, and core means of permanent magnet material positioned to be magnetized by the rectified current flowing in said winding.

3. Apparatus for use in measuring the character of surges comprising, a current transformer, pick-up winding means energized from the secondary of said transformer, dry contact type metallic rectifier means for rectifying the current supplied by said transformer to said winding means, and a core element for said pick-up winding made of a material capable of being permanently magnetized by and in proportion to the maximum rectified current impulse in the pick-up winding means.

4. Apparatus for use in measuring the character of surges occurring on polyphase alternating-current circuits comprising, a current transformer for each phase of such circuit, a pair of pick-up coils for each transformer connected in parallel with the secondary winding thereof, and a rectifier connected in series with each pick-up coil such that the current impulses flowing in one direction in a transformer secondary flows only in one pick-up coil of its pair and the current impulses flowing in the opposite direction in this transformer secondary flows only in the other pick-up coil of its pair, all of said rectifiers being of the copper oxide type and arranged in a stack.

5. Apparatus for use in measuring the character of current surges comprising, a current transformer having a primary traversed by the surge to be investigated and a secondary for obtaining a lower current proportional to the surge current, a pick-up coil provided with a core element of a material capable of being permanently magnetized for determining the maximum positive component of a surge, a second pick-up coil and core element similar to the first for determining the maximum negative component of the same surge, said pick-up coils being connected in parallel to the secondary winding of said transformer, and rectifier means included in series with each pick-up coil for directing the positive and negative surge currents induced in the secondary of said transformer to the positive and negative component pick-up coils, respectively.

6. Apparatus for measuring characteristics of current surges comprising, a current-reducing transformer having a primary forming a part of a surge-current circuit, a pair of pick-up coils energized from the secondary of said transformer, rectifier means included in the energizing circuits of said coils for segregating reverse current impulses from said transformer and directing current impulses of one sign only through one pick-up coil and current impulses of the other sign only through the other coil, removable core elements for said coils composed of material capable of being permanently magnetized by and in proportion to the maximum current impulse through said coils, and a magnetic field measuring instrument designed to compare the relative strengths of the permanent magnet field of said core elements and calibrated therewith and with said current transformer and pick-up coils to give an indication of the magnitude and polarity of the maximum surge current through the primary of said transformer.

7. Apparatus for use in measuring the character of current surges comprising, a current transformer, full-wave rectifier means connected with the secondary winding of said transformer, a pick-up winding, and core means of permanent magnet material positioned to be magnetized by the current flowing in said winding, said winding being energized from said rectifier means in such manner as to magnetize said core means substantially in accordance with the summation of reverse current impulses flowing in the secondary of said transformer.

8. Apparatus for use in measuring the character of current surges comprising, a current transformer, full-wave rectifier means connected with the secondary of said transformer, pick-up winding means connected to be energized by rectified current from said rectifier means, phase-shifting means included in the aforesaid connections for causing consecutive reverse current impulses from said transformer secondary to appear substantially simultaneously as rectified current impulses in said pick-up winding means, and core means of permanent magnet material magnetized by said pick-up winding means in accordance with the summation of the substantially simultaneous rectified current impulses therein.

9. Apparatus for determining the characteristics of current surges comprising, a current transformer, a pair of full-wave rectifiers connected to be supplied from the secondary of said transformer, pick-up winding means supplied by rectified currents from said pair of rectifier means, phase-shifting means associated with the supply connections to said rectifier for advancing the current impulses through one rectifier and retarding the current impulses through the other rectifier to the extent necessary to cause consecutive reverse current impulses from said transformer to be rectified substantially simultaneously by said pair of rectifiers, and core means of permanent magnet material positioned in said pick-up winding so as to be magnetized in accordance with the summation of the substantially simultaneous rectified current impulses.

OLIVER C. TRAVER.